(12) United States Patent
Mariotto et al.

(10) Patent No.: US 9,447,734 B2
(45) Date of Patent: Sep. 20, 2016

(54) ROTARY WING AIRCRAFT WITH A HYBRID POWER PLANT

(71) Applicant: AIRBUS HELICOPTERS, Marignane (FR)

(72) Inventors: Damien Mariotto, Lambesc (FR); Matthieu Connaulte, Eguilles (FR)

(73) Assignee: Airbus Helicopters, Marignane (FR)

( * ) Notice: Subject to any disclaimer, the term of this patent is extended or adjusted under 35 U.S.C. 154(b) by 468 days.

(21) Appl. No.: 14/220,618

(22) Filed: Mar. 20, 2014

(65) Prior Publication Data

US 2014/0283519 A1    Sep. 25, 2014

(30) Foreign Application Priority Data

Mar. 25, 2013    (FR) ...................................... 13 00683

(51) Int. Cl.

| | |
|---|---|
| *F02C 7/36* | (2006.01) |
| *B60K 6/38* | (2007.10) |
| *B60K 6/48* | (2007.10) |
| *B60K 6/383* | (2007.10) |
| *B64C 27/12* | (2006.01) |
| *B64D 27/24* | (2006.01) |

(Continued)

(52) U.S. Cl.
CPC ................. *F02C 7/36* (2013.01); *B60K 6/383* (2013.01); *B60K 6/48* (2013.01); *B64C 27/12* (2013.01); *B64D 27/24* (2013.01); *B60K 2006/268* (2013.01); *B64D 2027/026* (2013.01); *Y02T 10/6221* (2013.01); *Y02T 50/44* (2013.01); *Y02T 50/64* (2013.01)

(58) Field of Classification Search
CPC .. B60K 6/383; B60K 6/48; B60K 2006/268; B64C 27/12; B64D 27/24; B64D 2027/026; F02C 7/36; Y02T 50/44; Y02T 50/64
USPC ..................................... 60/772, 792; 415/123
See application file for complete search history.

(56) References Cited

U.S. PATENT DOCUMENTS

| | | | |
|---|---|---|---|
| 8,283,796 | B2 | 10/2012 | Certain |
| 8,657,566 | B2 | 2/2014 | Bedrine et al. |
| 9,162,771 | B2 | 10/2015 | Roggemans et al. |

(Continued)

FOREIGN PATENT DOCUMENTS

| | | |
|---|---|---|
| EP | 2148066 | 1/2010 |
| FR | 2929324 | 10/2009 |

(Continued)

OTHER PUBLICATIONS

French Search Report for FR 1300683, Completed by the French Patent Office on Dec. 16, 2013, 7 Pages.

*Primary Examiner* — Jesse Bogue
*Assistant Examiner* — Dapinder Singh
(74) *Attorney, Agent, or Firm* — Brooks Kushman P.C.

(57) ABSTRACT

An aircraft (1) having at least one rotor (2) driven by a main gearbox (3), at least one fuel-burning engine (4), an on-board electricity network (7), and at least one electrical machine (10) corresponding to the engine (4) and capable of operating both in electric motor mode and also in electricity generator mode, each electrical machine (10) being mechanically connected to said main gearbox (3) by first connection means (20) and being electrically connected to said on-board electricity network (7). Second mechanical connection means (40) connect each electrical machine (10) mechanically to a gas generator (5) of an engine.

20 Claims, 5 Drawing Sheets

(51) Int. Cl.
*B60K 6/26* (2007.10)
*B64D 27/02* (2006.01)

(56) References Cited

U.S. PATENT DOCUMENTS

2007/0089420 A1* 4/2007 Klingels ............... B64D 13/06
 60/772
2011/0049891 A1* 3/2011 Bedrine ................ F01D 15/10
 290/46
2011/0304156 A1 12/2011 Schiek et al.
2012/0025032 A1 2/2012 Hopdjanian et al.
2013/0219905 A1 8/2013 Marconi et al.

FOREIGN PATENT DOCUMENTS

| FR | 2962404 | 1/2012 |
| FR | 2993243 A1 | 1/2014 |
| WO | 2012059671 | 5/2012 |

* cited by examiner

Fig.10

ROTARY WING AIRCRAFT WITH A HYBRID POWER PLANT

CROSS REFERENCE TO RELATED APPLICATION

This application claims priority to French patent application No. FR 13 00683 filed on Mar. 25, 2013, the disclosure of which is incorporated in its entirety by reference herein.

BACKGROUND OF THE INVENTION (1) Field of the Invention

The present invention relates to a rotary wing aircraft that has a hybrid power plant.

The present invention thus relates to the field of aircraft that include in particular a rotary wing. More particularly, the invention relates to aircraft having a so-called "hybrid" power plant for driving rotation of at least one rotor of a rotary wing via a main gearbox of the aircraft. Such a main gearbox is referred to more simply by its initials "main gearbox".

(2) Description of Related Art

A "hybrid" power plant designates an installation having at least one fuel-burning engine and at least one electrical member, each of them being suitable for driving the main gearbox.

The electrical member may be an electric motor, i.e. an electrical appliance that performs a driving function only.

Nevertheless, the electrical member may also be an electrical machine, i.e. an electrical appliance that performs both a driving function and an electricity generator function. An electrical machine can thus operate in an electric motor mode for driving rotation of mechanical members, or else in an electricity generator mode for generating electrical energy. An electrical machine is sometimes said to be "reversible" insofar as the electrical machine can switch from an electric motor mode to the electricity generator mode, and vice versa.

It should be observed that an electricity generator is an electrical appliance that performs solely a function of generating electricity.

A rotary wing aircraft may have one or more lift-providing rotors referred to as "main" rotors, and possibly one or more auxiliary rotors, e.g. for controlling the yaw movement of the aircraft.

The power plant then has at least one engine for driving the main rotors via the main gearbox.

The engine co-operates with a first electrical machine. This first electrical machine operates in electric motor mode when starting the aircraft in order to start the engine.

For example, the engine may be a turbine engine having a gas generator. The first electrical machine then serves to drive the gas generator in rotation on starting.

Once the engine has started, the first electrical machine can then operate in electricity generator mode in order to feed electrical energy to the on-board network of the aircraft.

The first electrical machine then transforms electrical energy into mechanical energy in order to start the engine as a first function, and transforms mechanical energy coming from the engine into electrical energy for the on-board network as a second function.

Furthermore, a hybrid power plant may include an auxiliary energy delivery system for adding to or replacing the drive produced by an engine by means of an electrical power plant mechanically connected to a main gearbox.

According to document FR 2 962 404, a second electrical machine is thus connected to the main gearbox.

The second electrical machine then transforms electrical energy into mechanical energy in order to drive the main gearbox as a third function, and transforms mechanical energy coming from the main gearbox into electrical energy for the on-board network as a fourth function.

Document FR 2 962 404 thus describes an electrical machine that is mechanically connected to an engine, and an electrical machine that is mechanically connected to a main gearbox.

That type of configuration is advantageous, but it can be relatively heavy and bulky by ensuring redundancy for the electrical machines.

In addition, the first electrical machine is capable of taking mechanical energy from the gas generator of the engine. The engine then runs the risk of operating at a compression ratio that is not optimized, thereby leading to a drop in its specific fuel consumption.

In conclusion, it can be understood that it is not easy to design, adapt, and implement a hybrid power plant and its configuration.

Document FR 2 929 324 describes a turbine engine connected to an electrical machine.

Document WO 2012/059671 describes a method of optimizing the specific fuel consumption of a twin-engine helicopter and a twin-engine configuration with a regulator system for operating it.

Also known are documents US 2011/304156 and EP 2 148 066.

BRIEF SUMMARY OF THE INVENTION

An object of the present invention is thus to propose an alternative for a rotary wing aircraft having a hybrid power plant.

According to the invention, a rotary wing aircraft is provided with at least one rotor driven in rotation by a main gearbox, the aircraft having at least one fuel-burning engine comprising a gas generator and a free turbine in order to drive the main gearbox. Furthermore, the aircraft is provided with an on-board electricity network and with at least one electrical machine that operates in electric motor mode and in electricity generator mode, each electrical machine being mechanically connected to the main gearbox via first connection means and electrically connected to the on-board electricity network. For example, the aircraft includes at most one electrical machine per engine. The electrical machine is suitable for driving said main gearbox and for generating electricity.

This aircraft is remarkable in particular by being provided with second mechanical connection means for mechanically connecting each electrical machine to a gas generator, each first connection means comprising an upstream portion situated between a first mechanical member and an electrical machine, together with a downstream portion situated between the main gearbox and the first mechanical member, the first mechanical member being provided with two rotary parts and with constraining means to constrain said two rotary parts to rotate together in flight permanently except in the event of the electrical machine jamming, and for separating said two rotary parts from rotating together on the ground when the upstream portion rotates at an upstream speed of rotation faster than a downstream speed of rotation of the downstream portion.

Under such circumstances, an aircraft having only one engine does not require two electrical machines, and an aircraft having two engines does not require three electrical machines, where such electrical machines are used for the purposes of starting the engine, powering the on-board electricity network, or indeed contributing to driving the main gearbox.

A single electrical machine mechanically connected to the main gearbox and to a gas generator enables those functions to be performed, possibly in co-operation with an additional motor-only electrical machine depending on the embodiment.

The first connection means enabling the electrical machine to be connected to the main gearbox are provided with a first mechanical member that may be referred to as being "reversible". The first mechanical member serves to interrupt the connection between an electrical machine and a main gearbox in situations that are defined by the manufacturer.

For example, the first connection means connect the electrical machine mechanically and functionally with the main gearbox in particular either for generating electricity or else for using the electrical machine to drive the main gearbox. The first connection means permanently connect the electrical machine both mechanically and functionally with the main gearbox while in flight, except in the event of the electrical machine accidentally jamming, and only under certain conditions while on the ground.

In addition, if necessary the second connection means make it possible for a gas generator to co-operate with an electrical machine.

Under such circumstances, the invention provides an alternative solution to existing aircraft, this solution making it possible to avoid using two electrical machines, namely one electrical machine connected to a gas generator and another electrical machine connected to a main gearbox.

This aircraft may include one or more of the following additional characteristics.

Thus, in a first variant, the first mechanical member comprises a clutch. The constraining means may be an electrical, electronic, or mechanical processor unit controlling the clutch so as to connect together or separate an electrical machine and a main gearbox.

In a second variant, the first mechanical member comprises a blockable freewheel provided with a driving rotary part connected to the main gearbox and a driven rotary part connected to a reversible machine and to a constraining system for constraining the driving rotary part to rotate together with the driven rotary part so as to operate:
  either in an interpenetrating mode in flight during which the driving rotary part and the driven rotary part are constrained to rotate together; or else
  in a freewheel mode on the ground during which the driving rotary part drives rotation of the driven rotary part when said driving rotary part has a speed of rotation faster than the speed of rotation of the driven rotary part.

Such a blockable freewheel may include rolling members such as balls or rollers interposed between two sections of the driving and driven rotary parts, like a conventional freewheel or "overrunning clutch". In addition, and by way of example, the blockable freewheel may include movable dog clutches for constraining the driving and driven rotary parts to rotate together.

The constraining system then includes rolling members and movable dog clutches. The constraining means may be an electrical, electronic, or mechanical processor unit controlling the position of the dog clutches.

The first and second variants may optionally be combined, one variant being implemented for one electrical machine and the other variant being implemented for another electrical machine.

Furthermore, each electrical machine may be connected to electrical energy storage means. In electricity generator mode, the electrical machine can then deliver electrical energy to the storage means.

Furthermore, each electrical machine is optionally connected to the on-board electricity network via a power converter, in particular if the voltage levels are different. For example, a direct current/direct current (DC/DC) converter may be used for matching the voltage of the electrical energy that is being produced to the voltage of the on-board network.

In a first arrangement, at least one electrical machine is mechanically connected only to the main gearbox and to a gas generator.

This first arrangement presents the advantage of not requiring any modification to the connection between an engine and a main gearbox. However, the main gearbox of an existing aircraft needs to be adapted in order to be connected to an electrical machine.

In a second arrangement, at least one electrical machine is mechanically connected to the main gearbox, and also to a gas generator and to the free turbine of a gas generator, by being interposed between said free turbine and said main gearbox.

More precisely, the electrical machine may be arranged between an engine and a brake. Such a brake is referred to as a "rotor brake" insofar as its function consists in preventing movement of the rotor that is driven in rotation by the main gearbox.

Under such circumstances, the aircraft optionally has a freewheel provided with a driving portion connected to a free turbine and a driven portion connected to a drive shaft of first connection means, the drive shaft co-operating with an electrical machine and leading to the first mechanical member of the first connection means, a rotor brake being arranged between the first mechanical member and the main gearbox. The electrical machine may be provided with a rotary element arranged around the drive shaft.

This second arrangement presents the advantage of not requiring any modification to the main gearbox. However, the connection between the engine and the main gearbox of an existing aircraft needs to be adapted.

The first and second arrangements may optionally be combined, one arrangement being implemented for one electrical machine and the other arrangement being implemented for another electrical machine.

Furthermore, at least one second connection means may comprise mechanical means presenting a transmission ratio $\alpha$ greater than the quotient of the maximum speed of rotation $V_{gg}$ of the gas generator divided by the maximum speed of rotation $V_{ft}$ of the free turbine of the given engine, in application of the relationship:

$$\alpha > \frac{V_{gg}}{V_{ft}}$$

The maximum speed of rotation $V_{gg}$ of the gas generator and the maximum speed of rotation $V_{ft}$ of the free turbine correspond to the maximum speeds of rotation that can be reached while the aircraft is in use. For example, these speeds correspond to the speeds that are reached when the engine is developing its maximum continuous power known to the person skilled in the art for an aircraft having one engine, or indeed to the speeds that are reached when the engine is developing a contingency power such as the 30 second one engine inoperative (OE130″) power known to the person skilled in the art for an aircraft having a plurality of engines.

It should thus be understood that the term "maximum speed" of a parameter designates the maximum speed that the parameter can reach. These maximum speeds may be determined by testing, in particular.

For example, a turbine engine may achieve a maximum speed of rotation Vft for its free turbine of about 23,000 revolutions per minute (rpm) and a maximum speed of rotation Vgg for its gas generator of about 53,000 rpm in an aircraft having an engine.

These maximum speeds may correspond to the highest speed that can be reached by a parameter when associated with a safety margin.

Such mechanical means can enable the speed of rotation of certain members of the second connection means to be adapted depending on choices made by the manufacturer. The advantage of such a ratio is explained in greater detail below when describing various embodiments.

Furthermore, at least second connection means may include a separator member for separating an electrical machine from a gas generator in predetermined situations. For example, the separator member has a freewheel so as to avoid the electrical machine being driven by a gas generator in flight in order to avoid degrading the performance of the engine.

In a first embodiment, said aircraft has one electric motor per engine, each electric motor being mechanically connected to a gas generator and electrically connected to the on-board electricity network, possibly via a converter if the voltage levels are different.

Depending on the voltage levels of the electric motor and of the on-board electricity network, the aircraft may include a power converter arranged between the electric motor and the on-board electricity network.

This first embodiment thus proposes using one electric motor per engine together with at least one electrical machine. The electrical machine may be arranged in the first arrangement or in the second arrangement. The first embodiment can reduce the weight and the size of the configuration, in comparison with a configuration having two electrical machines.

The electrical machine can then transform the mechanical energy coming from the engine or from the main gearbox into electrical energy for the on-board network or for energy storage means.

In flight, the electrical machine may be driven by the main gearbox in order to generate electrical energy. This avoids the electrical machine taking mechanical energy from the gas generator of the engine, and as a result it does not disturb its operation.

In addition, the electrical machine may transform electrical energy into mechanical energy in order to drive the main gearbox.

Finally, the electric motor may be used for starting the engine, and possibly for delivering additional power to the gas generator in flight during transient stages of flight.

In a variant of this first embodiment, no second mechanical connection is arranged between the electrical machine and the gas generator.

In the variant with second mechanical connection means, at least one second connection means includes a freewheel having a driving portion connected to a gas generator of a given engine and a driven portion connected to mechanical means presenting a predetermined transmission ratio, the transmission ratio being greater than the quotient of the maximum speed of rotation of the gas generator divided by the maximum speed of rotation of the free turbine of the given engine.

In a second embodiment, the aircraft has at least one electrical machine, e.g. at most a single electrical machine per engine. The weight and the size of the power plant are thus minimized.

The first connection means then serve in particular to enable the electrical machine to transform mechanical energy coming from the main gearbox and to transform electrical energy into mechanical energy in order to drive the main gearbox.

In addition, the second connection means then make it possible in particular for the electrical machine to transform mechanical energy coming from the engine into electrical energy while in flight, for example, and to transform electrical energy into mechanical energy in order to drive the gas generator.

In a first version, at least second connection means include a freewheel comprising a first driving portion connected to a gas generator of a given engine and a first driven portion connected to first mechanical means presenting a first predetermined transmission ratio. The second connection means also include a second freewheel comprising a second driven portion connected to said gas generator of a given engine and a second driving portion connected to second mechanical means presenting a second predetermined transmission ratio. Said first transmission ratio α is optionally greater than the quotient of the maximum speed of rotation Vgg of the first gas generator divided by the maximum speed of rotation Vft of the free turbine of the given engine, said second transmission ratio β being less than the quotient of the maximum speed of rotation Vgg of the gas generator divided by the maximum speed of rotation Vft of the free turbine of the given engine, i.e.:

$$\alpha > \frac{Vgg}{Vft} \text{ and } \beta < \frac{Vgg}{Vft}$$

Optionally, the first mechanical means and the second mechanical means are connected to an intermediate shaft, and a breakable section is interposed between said second mechanical means and said intermediate shaft. The breakable section seeks to limit the power that can be transmitted to the gas generator by an electrical machine to a power threshold. Above the power threshold, the breakable section breaks as a safety measure.

In a second version of this second embodiment, at least one second connection means includes a second mechanical member having two movable parts capable of being constrained reversibly to rotate together with each other on request, namely a movable part connected to a gas generator of a given engine, and a movable part connected to mechanical means presenting a predetermined transmission ratio, said transmission ratio being greater than the quotient of the maximum speed of rotation of the gas generator divided by the maximum speed of rotation of the free turbine of the given engine.

The second mechanical member may be a clutch or a blockable freewheel having a driving movable part connected to the gas generator and a driven movable part connected to the mechanical means. Said second mechanical member may thus comprise a blockable freewheel having said driving movable part connected to a gas generator and said driven movable part connected to said mechanical means together with a device for constraining the driving movable part in rotation with the driven movable part to operate:

either, on the ground, in an interpenetrating mode during which the driving movable part of the second mechanical member and the driven movable part of the second mechanical member are constrained to rotate together; or else in flight, in a freewheel mode during which the driving movable part of the second mechanical member drives rotation of the driven movable part of the second mechanical member when said driving movable part of the second mechanical member possesses a speed of rotation faster than the speed of rotation of the driven movable part of the second mechanical member.

In a third version of the second embodiment, at least one second connection means includes a freewheel comprising a driven portion connected to a gas generator of a given engine and a driving portion connected to mechanical means presenting a predetermined transmission ratio, said transmission ratio being greater than the quotient of the maximum speed of rotation of the gas generator divided by the maximum speed of rotation of the free turbine of the given engine.

This third version is advantageous when the manufacturer does not desire to generate electricity while the main gearbox is not in operation.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements shown in more than one of the figures are given the same references in each of them.

DETAILED DESCRIPTION OF THE INVENTION

FIGS. 1 to 9 show various embodiments of an aircraft of the invention.

Figure 1:
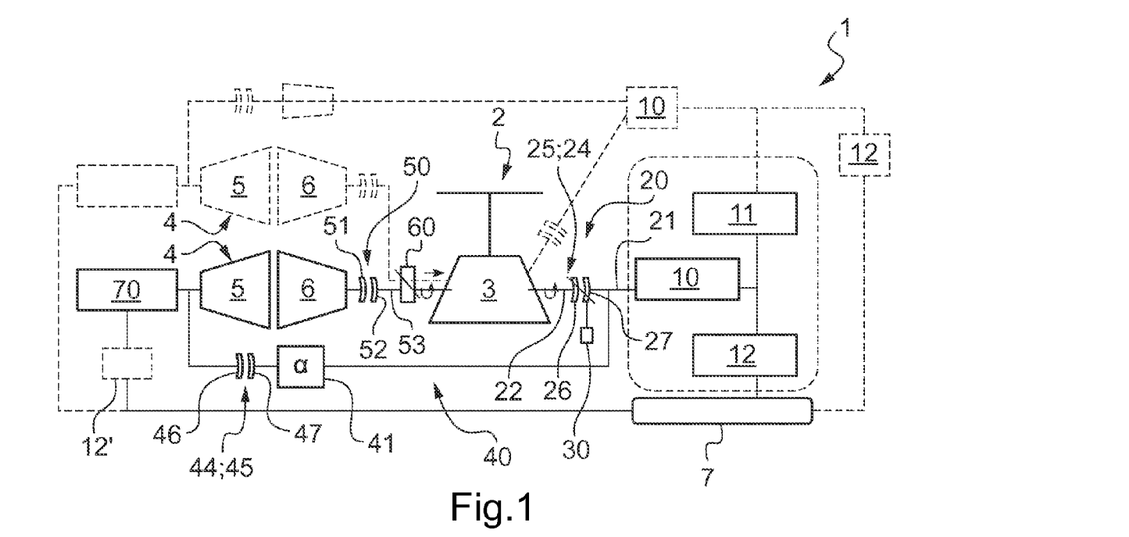
FIG. 1 shows a first embodiment provided with an electrical machine arranged in a first arrangement.

With reference to FIG. 1, and independently of the embodiment, the aircraft 1 includes a main gearbox 3 driving a rotor 2.

In order to drive the main gearbox 3, the aircraft includes at least one fuel-burning engine 4. A second engine is shown in dashed lines in FIG. 1. It should be understood that the aircraft shown in FIGS. 2 to 9 may also have a plurality of engines, without going beyond the ambit of the invention.

Each engine is then provided with a gas generator 5 and a free turbine 6. The free turbine 6 of an engine is mechanically connected to the main gearbox. A freewheel 50 and a rotor brake 60 may in particular be interposed between each free turbine 6 and the main gearbox 3.

The power plant of this aircraft includes electrically-driven motor means.

Thus, the aircraft 1 has at least one electrical machine 10 corresponding to the engine 4. Each engine may co-operate with a single dedicated electrical machine, or else at least two engines may co-operate with a common electrical machine. Thus, the aircraft has at most one electrical machine per engine.

Each electrical machine 10 can operate in an electric motor mode in order to drive a member of the aircraft, and also in an electricity generator mode in order to produce electrical energy as a function of requirements. Reference may be made to the literature in order to obtain a description of such an electrical machine.

Each electrical machine is electrically connected to an electricity network 7 on board the aircraft via a power converter 12, e.g. if the observed voltage levels are different. Furthermore, each electrical machine 10 is optionally electrically connected to electrical energy storage means 11, such as a battery or a set of batteries and/or a set of supercapacitors, for example.

The storage means may serve as storage means for the on-board network of the aircraft via the power converter if the voltage levels are different. This characteristic makes it possible to minimize the weight of the aircraft by limiting the number of energy storage elements.

The on-board electricity network may be independent of the auxiliary drive system. Nevertheless, it is possible to use a single electricity network having the various pieces of electrical equipment all connected thereto. This characteristic has the potential of making it possible to reduce the dimensions of the electrical power cables insofar as the amount of electric current exchanged is smaller, or to use energy conversion functions in common for those pieces of equipment that consume a large amount of electrical energy.

Each electrical machine 10 is also mechanically connected to the main gearbox via first connection means 20.

The first connection means 20 have a first mechanical member 24 interposed between the electrical machine and the main gearbox.

Thus, the first mechanical member 24 possesses an upstream rotary part 27 mechanically connected by an upstream portion 21 of the first connection means 20 to an electrical machine 10. Furthermore, the first mechanical member 24 includes a downstream rotary part 26 mechanically connected by a downstream portion 22 of the first connection means 20 to the main gearbox 3.

The first mechanical member is also provided with constraining means 30 for constraining said upstream and downstream rotary parts to rotate together in flight, and for separating rotation of said upstream and downstream rotary parts on the ground when the upstream portion rotates at an upstream speed of rotation Vmr that is faster than a downstream speed of rotation Vbtp of the downstream portion 22.

The first mechanical member may be a clutch.

Figure 10:
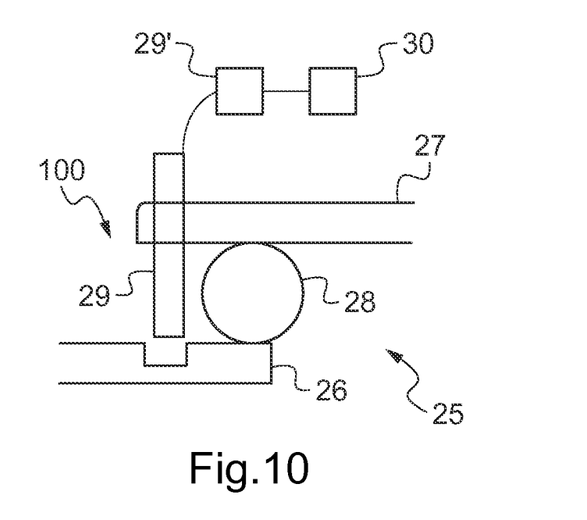
FIG. 10 shows a blockable freewheel.

Nevertheless, and with reference to FIG. 10, the first mechanical member 24 may possess a blockable freewheel 25.

The blockable freewheel then has a downstream rotary part that is referred to as a driving rotary part 26, and an upstream rotary part that is referred to as a driven rotary part 27. The driving rotary part 26 is thus mechanically connected to the main gearbox 3, with the driven rotary part 27 being mechanically connected to an electrical machine 10.

A constraining system 100 for constraining the driving rotary part 26 to rotate together with the driven rotary part 27 includes roller means suitable for co-operating with ramps of the driving and driven rotary parts, like a conventional freewheel.

By way of example, the constraining system also includes dog clutches 29 capable of being moved by a system 29' for reversibly constraining the driving rotary part to rotate together with the driven rotary part.

The blockable freewheel then operates:
  either, in flight, in an interpenetrating mode in which the driving rotary part 26 and the driven rotary part 27 are constrained to rotate together; or else
  on the ground, in a freewheel mode in which the driving rotary part 26 drives rotation of the driven rotary part 27 so long as the driving rotary part 26 possesses a speed of rotation faster than the speed of rotation of the driven rotary part 27.

In the first arrangement shown in FIGS. 1, 3, 4, 6, and 8, an electrical machine is mechanically connected to a dedicated inlet of the main gearbox.

In contrast, in the second arrangement shown in FIGS. 2, 5, 7, and 9, the electrical machine is interposed between the free turbine 6 and the main gearbox 3.

In this second arrangement, the free turbine of an engine can drive the main gearbox 3 successively via the freewheel 50, a drive shaft 53, and a rotor brake 60. The driving portion 51 of the freewheel 50 is thus mechanically connected to the free turbine, with the driven portion 52 of the freewheel 50 being mechanically connected to the drive shaft 53.

The electrical machine 10 may thus be arranged in parallel with the drive shaft 53 so as to be capable of driving rotation of the drive shaft in electric motor mode or else of being driven in rotation by the drive shaft in electricity generator mode.

Furthermore, a first mechanical member 24 is then arranged on the drive shaft between the electrical machine 10 and the main gearbox, or between the electrical machine 10 and the rotor brake 60, if any.

Furthermore, and with reference to FIG. 1, the aircraft has second mechanical connection means 40 for each electrical machine in order to connect an electrical machine 10 mechanically to a gas generator 5. The second connection means may thus be mechanically connected to the upstream portion 21 of the first connection means, i.e. between the electrical machine 10 and a first mechanical member 24.

Figure 3:
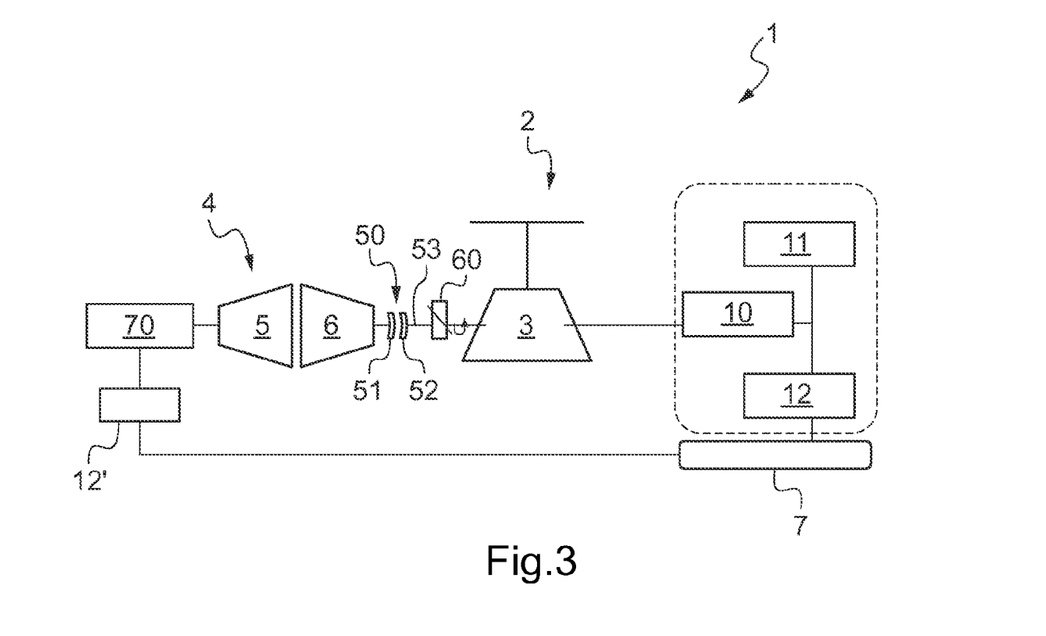
FIG. 3 shows an alternative to the first embodiment.

It should be observed that the variant in FIG. 3 need not have this second connection means.

The second connection means may comprise in particular mechanical means 41 presenting a transmission ratio α greater than the quotient of the maximum speed of rotation of the gas generator divided by the maximum speed of rotation of the free turbine of this given engine. These mechanical means may comprise a plurality of distinct gearwheels in order to obtain the required transmission ratio.

Furthermore, at least one second connection means 40 includes a separator member 44 for separating an electrical machine 10 from a gas generator 5 in predetermined situations.

Figure 2:
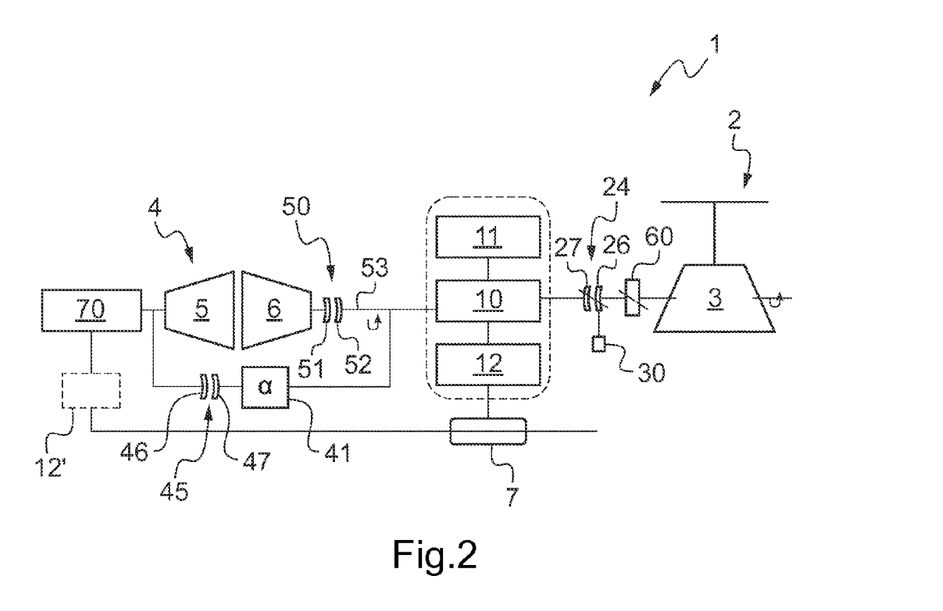
FIG. 2 shows a first embodiment provided with an electrical machine arranged in a second arrangement.

More precisely, FIG. 1 shows a first embodiment using an electrical machine in a first arrangement, while FIG. 2 shows the first embodiment using an electrical machine in the second arrangement.

In this first embodiment, an engine is associated with an electrical machine and with an electric motor 70.

The electric motor 70 is thus mechanically connected to a generator via a mechanical power transmission train, the second connection means 40 possibly leading to this transmission train. The electric motor 70 is also electrically connected to the on-board electricity network 7, optionally via a power converter 12' if the voltage levels of the electric motor 70 and of the electricity network 7 are different.

In this first embodiment, the second connection means are provided with a freewheel 45 and with mechanical means 41 presenting a predetermined transmission ratio α. The freewheel 45 is provided with a driving portion 46 mechanically connected to a gas generator 5 and a driven portion 47 mechanically connected to the mechanical means 41. The transmission ratio α is greater than the quotient of the maximum speed of rotation of the gas generator divided by the maximum speed of rotation of the free turbine of the engine.

Under such circumstances, on the ground, the blockable freewheel is positioned in freewheel mode, the rotor brake being engaged to prevent the rotor from rotating.

The electric motor is then activated in order to start the gas generator. When the gas generator has started, i.e. once it has reached a given speed of rotation, the gas generator drives rotation of the electrical machine 10 via the second connection means. The electrical machine can thus generate electricity.

Since the blockable freewheel is in freewheel mode, the main gearbox is not driven by the second connection means.

In flight, the blockable freewheel is positioned in interpenetrating mode, while the rotor brake is released and the upstream and downstream portions 21 and 22 rotate at the same speed.

In electricity generator mode, the transmission ratio α of the mechanical means 41 serve to guarantee that the electrical machine is driven by the free turbine indirectly via the main gearbox in the first arrangement, or directly in the second arrangement.

The electrical machine thus does not interfere with the operation of the gas generator.

In electricity generator mode, the electrical machine contributes to driving the main gearbox without acting on the gas generator.

In addition, the electrical machine may be used to deliver mechanical power to the gas generator, e.g. for the purpose of reducing the specific fuel consumption of the engine.

From a safety point of view, the freewheel 50 prevents the main gearbox jamming in the event of the free turbine being jammed.

Furthermore, the freewheel 45 of the second connection means prevents an opposing torque being created in the event of the gas generator jamming.

Finally, in the event of the electrical machine jamming, the constraining means 30 act on the blockable freewheel to cause it to operate in freewheel mode so as to avoid causing the main gearbox to jam.

FIGS. 4 to 9 show variants of a second embodiment.

This second embodiment consists in using at least one electrical machine. Under such circumstances, this second embodiment does not have the electric motor used in the first embodiment.

Figure 4:
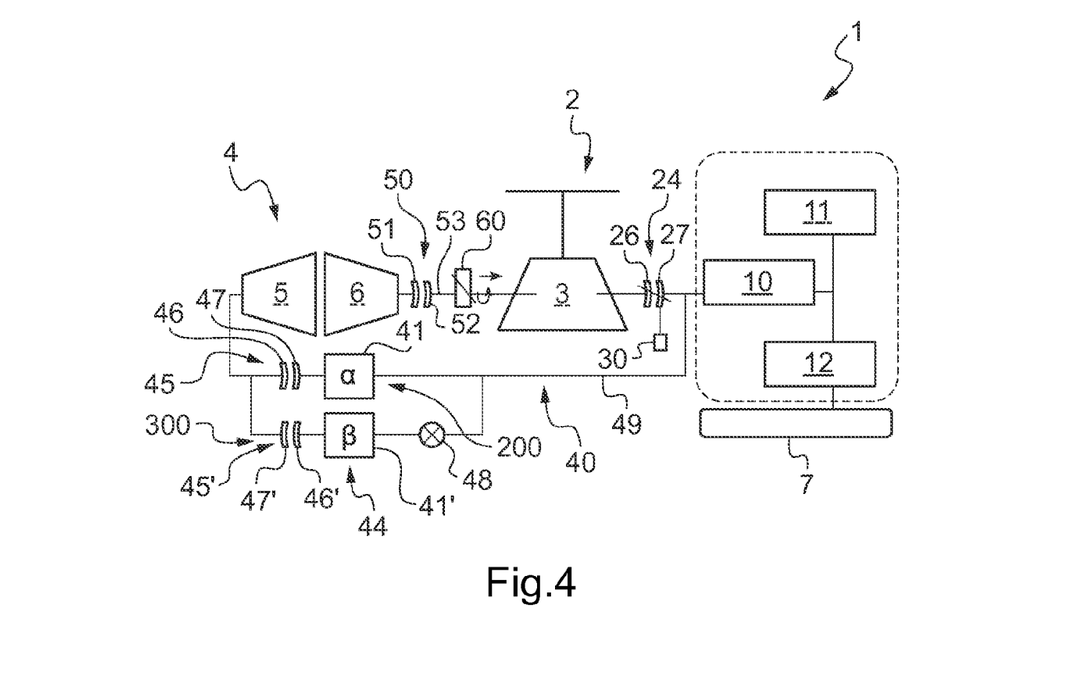
FIGS. 4 and 5 show a first version of a second embodiment respectively in the first and second arrangements.
Figure 5:
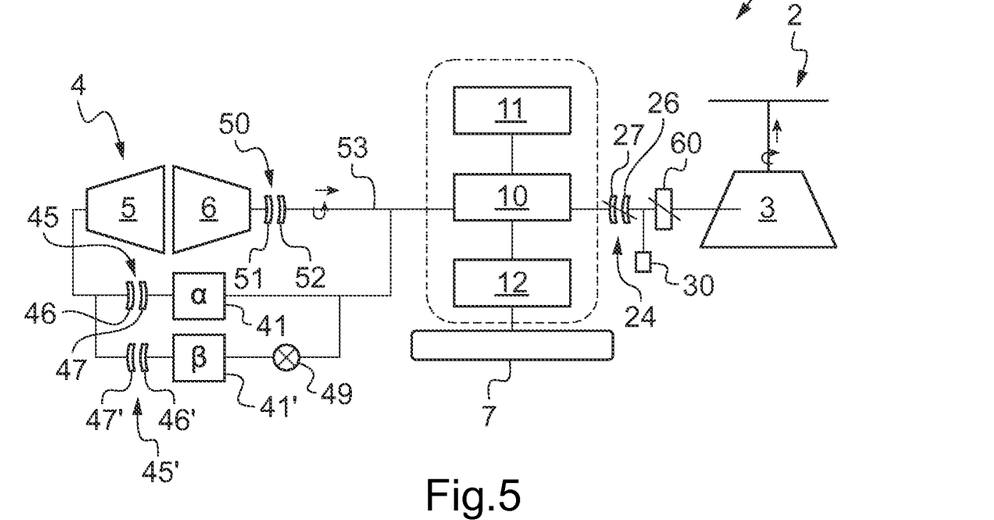

FIGS. 4 and 5 show a first version of the second embodiment. More precisely, FIG. 4 shows a first version of the second embodiment using an electrical machine in a first arrangement, while FIG. 5 shows a first version of the second embodiment using an electrical machine in the second arrangement.

In this first version, and with reference to FIG. 4, the second connection means 40 comprise two mechanical systems 200 and 300 arranged in parallel and mechanically connected by an intermediate shaft 49 to an electrical machine 10. These two mechanical systems 200 and 300 are also mechanically connected by a mechanical transmission train to a gas generator.

It should be observed that the term "shaft" is used to designate a mechanical connection involving at least one shaft. Thus, the intermediate shaft may comprise a plurality of shafts and connection means, for example.

The first mechanical system 200 has a first freewheel 45 having a first driving portion 46 mechanically connected to a gas generator 5 and a first driven portion 47 mechanically connected to first mechanical means 41. The first mechanical means 41 present a first transmission ratio α greater than the quotient of the maximum speed of rotation of the gas generator divided by the maximum speed of rotation of the free turbine of the engine.

The second mechanical system 300 has a second freewheel 45' with a second driven portion 47' mechanically connected to the gas generator 5 and a second driving portion 46' mechanically connected to second mechanical means 41'. The second mechanical means 41' present a second transmission ratio β less than the quotient of the maximum speed of rotation of the gas generator divided by the maximum speed of rotation of the free turbine of the engine.

In addition, a breakable section 48 is interposed between the second mechanical means 41' and the intermediate shaft 49.

Under such circumstances, on the ground, the blockable freewheel is positioned in freewheel mode and the rotor brake is engaged to prevent the rotor from rotating.

The electrical machine is then activated to start the gas generator via the second mechanical system 300. The first freewheel 45 of the first mechanical system prevents drive being transmitted from the electrical machine to the gas generator.

Once the gas generator has started, i.e. as from a given speed of rotation, the gas generator is independent. The electrical machine then changes to electricity generator mode.

Under such circumstances, the gas generator rotates the electrical machine 10 via the first mechanical system 200. The second freewheel 45' of the second mechanical system prevents drive being transmitted from the gas generator to the electrical machine.

Since the blockable freewheel is in freewheel mode, the main gearbox is not driven by the second connection system.

In flight, the blockable freewheel is positioned in interpenetrating mode, while the rotor brake is released and the upstream and downstream portions 21 and 22 rotate at the same speed.

In electricity generator mode, the transmission ratios α and β of the mechanical means 41 enable the electrical machine to be driven by the free turbine indirectly via the main gearbox in the first arrangement, and directly in the second arrangement.

The electrical machine therefore does not interfere with the operation of the gas generator.

In electricity generator mode, the electrical machine participates in driving the main gearbox without acting on the gas generator.

From a safety point of view, the freewheel 50 prevents the main gearbox jamming in the event of the free turbine being jammed.

Furthermore, the first freewheel 45 of the second connection means and the breakable section prevents an opposing torque being created in the event of the gas generator being jammed. The breakable section breaks in this configuration so the first freewheel would slip.

Finally, in the event of the electrical machine being jammed, the constraining means 30 act on the blockable freewheel to make it operate in freewheel mode so as to avoid jamming the main gearbox.

Figure 6:
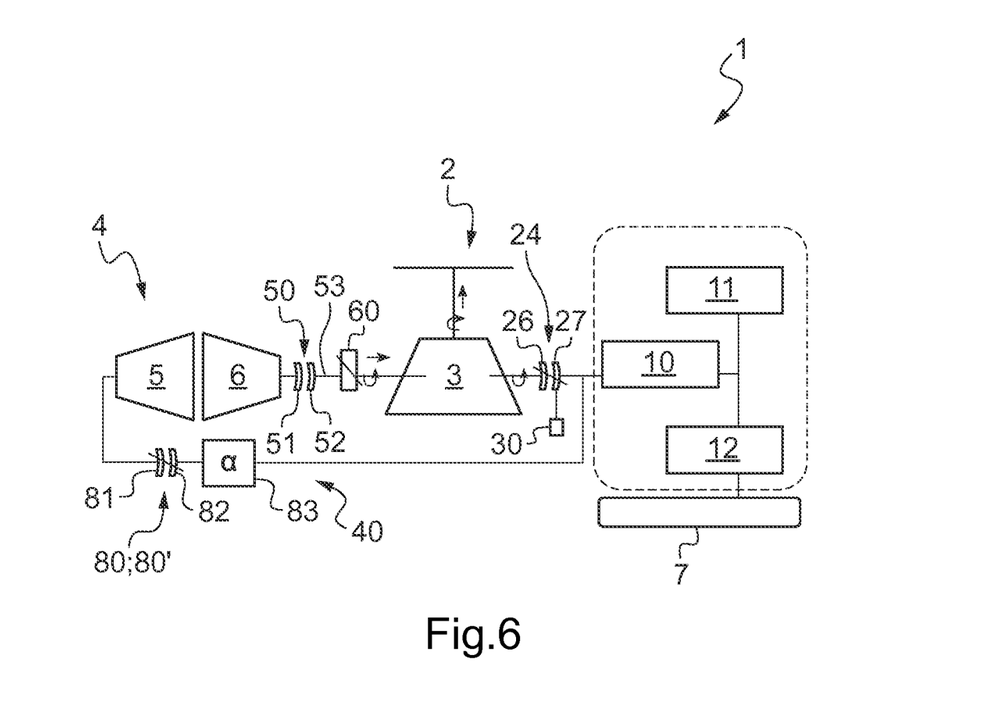
FIGS. 6 and 7 show a second version of a second embodiment respectively in the first and second arrangements.
Figure 7:
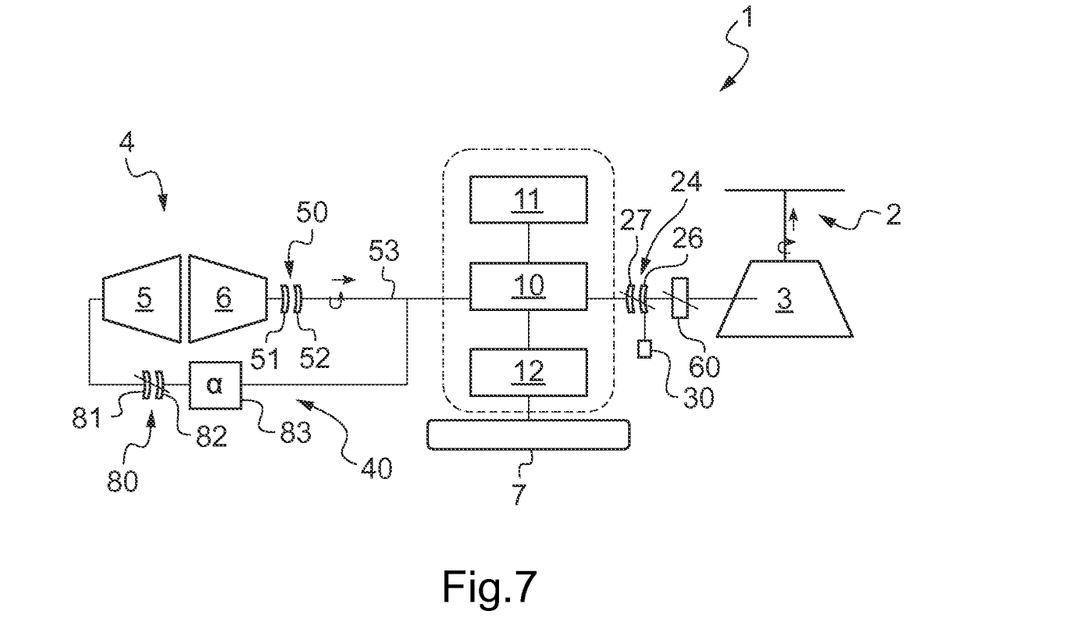

FIGS. 6 and 7 show a second version of the second embodiment. More precisely, FIG. 6 shows a second version of the second embodiment using an electrical machine in a first arrangement, while FIG. 7 shows a second version of the second embodiment using an electrical machine in the second arrangement.

In this second version, and with reference to FIG. 6, the second connection means 40 include mechanical means 83 presenting a transmission ratio α greater than the quotient of the maximum speed of rotation of the gas generator divided by the maximum speed of rotation of the free turbine of this given engine.

Furthermore, the second connection means are provided with a second mechanical member 80 provided with two movable parts 81 and 82 that can be reversibly constrained to rotate with each other on request, namely a movable part 81 mechanically connected to a gas generator 5 and a movable part 82 mechanically connected to the mechanical means 83. The second mechanical member may be a clutch, or it may be a blockable freewheel 80' as in the example shown. Such a blockable freewheel 80' then has a driving movable part mechanically connected to the gas generator and a driven movable part mechanically connected to the mechanical means.

Under such circumstances, on the ground, the blockable freewheel 25 of the first connection means 20 is positioned in freewheel mode, and the rotor brake is engaged to prevent the rotor from rotating.

In contrast, the blockable freewheel 80' of the second connection means 40 is in interpenetrating mode. The electrical machine is then activated to start the gas generator via the second mechanical system 300.

Once the gas generator has started, i.e. as from a given speed of rotation, the gas generator is independent. The electrical machine then changes to electricity generator mode.

Under such circumstances, the gas generator then rotates the electrical machine 10. The blockable freewheel 80' of the second connection means 40 is still in interpenetrating mode.

Since the blockable freewheel 25 of the first connection means 20 is in freewheel mode, the main gearbox is not driven by the second connection means.

In flight, the blockable freewheel 25 of the first connection means is positioned in interpenetrating mode while the rotor brake is released and the upstream and downstream portions 21 and 22 rotate at the same speed. In contrast, the blockable freewheel 80' of the second connection means 40 passes to freewheel mode.

In electricity generator mode, the electrical machine is driven by the free turbine indirectly via the MAIN GEARBOX in the first arrangement, and directly in the second arrangement.

The electrical machine therefore does not interfere with the operation of the gas generator.

In electricity generator mode, the electrical machine contributes to driving the main gearbox without acting on the gas generator, given the presence of the blockable freewheel 80' of the second connection means.

From a safety point of view, the freewheel 50 prevents the main gearbox jamming in the event of the free turbine being jammed.

Furthermore, in flight the blockable freewheel 80' of the second connection means prevents an opposing torque being created in the event of the gas generator being jammed.

Figure 8:
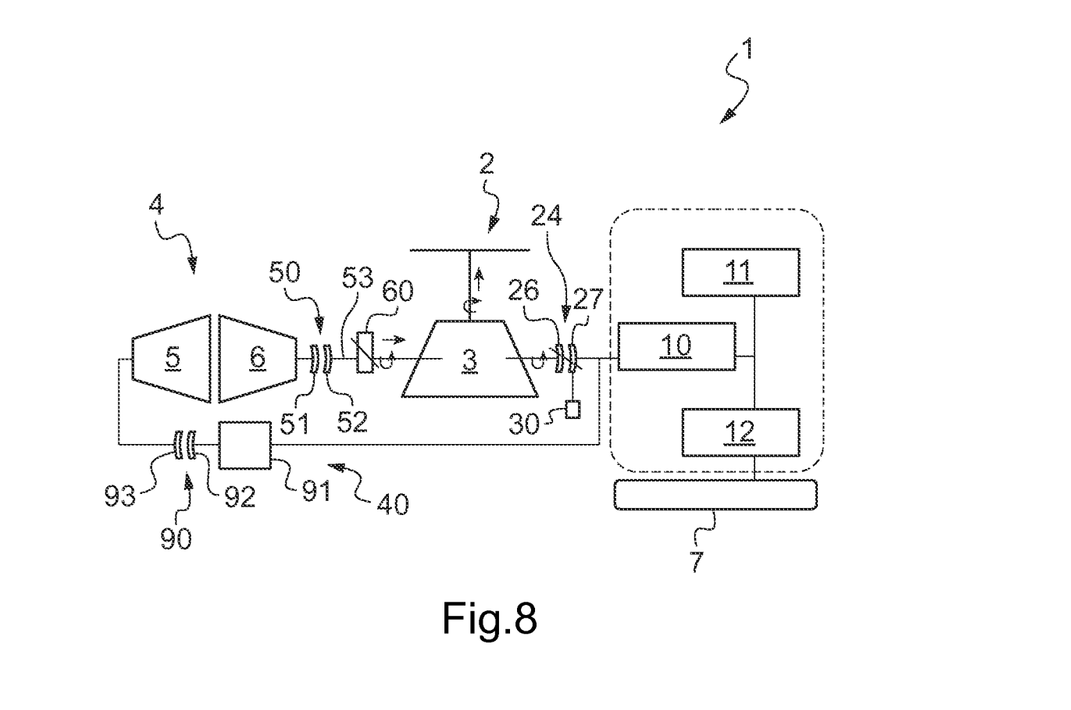
FIGS. 8 and 9 show a third version of a second embodiment respectively in the first and second arrangements.
Figure 9:
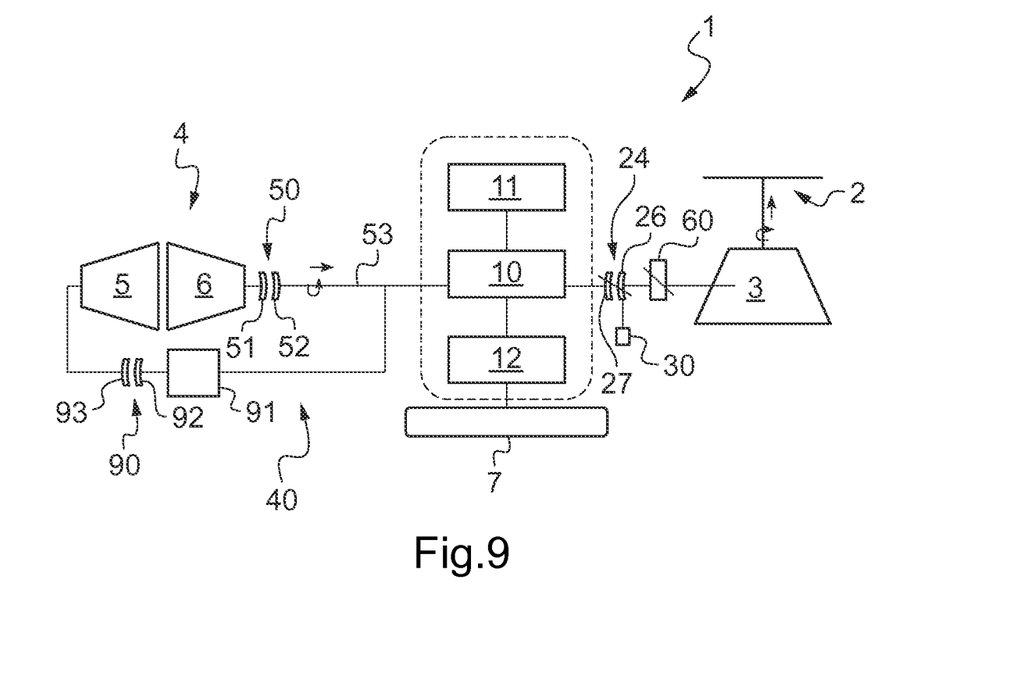

With reference to FIGS. 8 and 9, a third version of the second embodiment can be envisaged if the manufacturer does not desire to produce electricity on the ground.

Under such circumstances, it suffices to use a simple freewheel 90 in the second connection means instead of the second mechanical member 80 of the second version.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

What is claimed is:

1. A rotary wing aircraft comprising:
    at least one rotor driven in rotation by a main gearbox;
    at least one fuel-burning engine comprising a gas generator and a free turbine in order to drive the main gearbox;
    an on-board electricity network and with at least one electrical machine operating in electric motor mode and in electricity generator mode, each electrical machine being mechanically connected to the main gearbox via first connection means and electrically connected to the on-board electricity network, wherein the electrical machine is suitable for driving the main gearbox and for generating electricity energy, the aircraft is provided with second mechanical connection means for mechanically connecting each electrical machine to a gas generator, each first connection means comprising an upstream portion situated between a first mechanical member and an electrical machine, together with a downstream portion situated between the main gearbox and the first mechanical member, the first mechanical member being provided with two rotary parts and with constraining means to constrain said two rotary parts to rotate together in flight permanently except in the event of the electrical machine jamming, and for separating said two rotary parts from rotating together on the ground when the upstream portion rotates at an upstream speed of rotation (Vmr) faster than a downstream speed of rotation (Vbtp) of the downstream portion.

2. An aircraft according to claim 1, wherein the first mechanical member comprises a clutch.

3. An aircraft according to claim 1, wherein the first mechanical member comprises a blockable freewheel provided with a driving rotary part connected to the main gearbox and a driven rotary part connected to a reversible machine and to a constraining system for constraining the driving rotary part to rotate together with the driven rotary part so as to operate:
    either in an interpenetrating mode in flight during which the driving rotary part and the driven rotary part are constrained to rotate together; or else
    in a freewheel mode on the ground during which the driving rotary part drives rotation of the driven rotary part when the driving rotary part possesses a speed of rotation faster than the speed of rotation of the driven rotary part.

4. An aircraft according to claim 1, wherein at least one electrical machine is mechanically connected only to the main gearbox and to a gas generator.

5. An aircraft according to claim 1, wherein at least one electrical machine is mechanically connected to the main gearbox, and also to a gas generator and to the free turbine of a gas generator, by being interposed between the free turbine and the main gearbox.

6. An aircraft according to claim 4, wherein the aircraft has a freewheel provided with a driving portion connected to a free turbine and a driven portion connected to a drive shaft of first connection means, the drive shaft co-operating with an electrical machine and leading to the first mechanical member of the first connection means, a rotor brake being arranged between the first mechanical member and the main gearbox.

7. An aircraft according to claim 1, wherein each electrical machine is connected to electrical energy storage means.

8. An aircraft according to claim 1, wherein each electrical machine is connected to the on-board electricity network via a power converter.

9. An aircraft according to claim 1, wherein at least one second connection means comprises mechanical means presenting a transmission ratio ($\alpha$) greater than the quotient of the maximum speed of rotation of the gas generator divided by the maximum speed of rotation of the free turbine of the given engine.

10. An aircraft according to claim 1, wherein at least second connection means include a separator member for separating an electrical machine from a gas generator in predetermined situations.

11. An aircraft according to claim 1, wherein the aircraft has one electric motor per engine, each electric motor being mechanically connected to a gas generator and electrically connected to the on-board electricity network.

12. An aircraft according to claim 1, wherein the aircraft includes a power converter arranged between the electric motor and the on-board electricity network.

13. An aircraft according to claim 12, wherein at least one second connection means includes a freewheel having a driving portion connected to a gas generator of a given engine and a driven portion connected to mechanical means presenting a predetermined transmission ratio ($\alpha$), the transmission ratio ($\alpha$) being greater than the quotient of the maximum speed of rotation of the gas generator divided by the maximum speed of rotation of the free turbine of the given engine.

14. An aircraft according to claim 1, wherein at least one second connection means includes a freewheel comprising a first driving portion connected to a gas generator of a given engine and a first driven portion connected to first mechanical means presenting a first predetermined transmission ratio ($\alpha$), the second connection means including a second freewheel comprising a second driven portion connected to the gas generator of a given engine and a second driving portion connected to second mechanical means presenting a second predetermined transmission ratio ($\beta$), the first transmission ratio ($\alpha$) being greater than the quotient of the maximum speed of rotation of the first gas generator divided by the maximum speed of rotation of the free turbine of the given engine, and the second transmission ratio ($\beta$) being less than the quotient of the maximum speed of rotation of the gas generator divided by the maximum speed of rotation of the free turbine of the given engine.

15. An aircraft according to claim 14, wherein the first mechanical means and the second mechanical means are connected to the electric machine via an intermediate shaft, and a breakable section is interposed between the second mechanical means and the intermediate shaft.

16. An aircraft according to claim 1, wherein at least one second connection means includes a second mechanical member having two movable parts capable of being constrained reversibly to rotate together with each other on request, namely a driving movable part connected to a gas generator of a given engine, and a driven movable part connected to mechanical means presenting a predetermined transmission ratio ($\alpha$), the transmission ratio ($\alpha$) being greater than the quotient of the maximum speed of rotation of the gas generator divided by the maximum speed of rotation of the free turbine of the given engine.

17. An aircraft according to claim 16, wherein the second mechanical member comprises a blockable freewheel having the driving movable part connected to a gas generator and the driven movable part connected to the mechanical means together with a device for constraining the driving movable part in rotation with the driven movable part to operate:
- either, on the ground, in an interpenetrating mode during which the driving movable part of the second mechanical member and the driven movable part of the second mechanical member are constrained to rotate together; or else
- in flight, in a freewheel mode during which the driving movable part of the second mechanical member drives rotation of the driven movable part of the second mechanical member when the driving movable part of the second mechanical member possesses a speed of rotation faster than the speed of rotation of the driven movable part of the second mechanical member.

18. An aircraft according to any one of claim 1, wherein at least one second connection means includes a freewheel comprising a driven portion connected to a gas generator of a given engine and a driving portion connected to mechanical means presenting a predetermined transmission ratio ($\alpha$), the transmission ratio ($\alpha$) being greater than the quotient of the maximum speed of rotation of the gas generator divided by the maximum speed of rotation of the free turbine of the given engine.

19. A rotary wing aircraft comprising:
a main gearbox driving a rotor;
a fuel burning engine having a gas generator and a free turbine, the free turbine driving the main gearbox; and
an electrical machine mechanically connected to the main gearbox via a first mechanical member and mechanically connected to the gas generator via a second mechanical member, the first mechanical member having a first rotary part connected to the electrical machine and a second rotary part connected to the main gearbox, wherein the first mechanical member has a first position mechanically coupling the first and second rotary parts such that the electrical machine drives the main gearbox with the electrical machine operating as a motor and such that the main gearbox drives the electrical machine with the electrical machine operating as a generator to generate electrical energy, the first mechanical member in the first position in flight except in an event of the electrical machine jamming; and wherein the first mechanical member has a second position mechanically decoupling first and second rotary parts when the first rotary part rotates at a speed of rotation (Vmr) faster than a speed of rotation (Vbtp) of the second rotary part, the second mechanical member in to the second position on the ground.

20. An rotary wing aircraft comprising:

a main gearbox driving a rotor;

a fuel burning engine having a gas generator and a free turbine, the free turbine connected to the main gearbox via a freewheel to drive the main gearbox; and an electrical machine mechanically connected to the main gearbox via a first mechanical member and mechanically connected to the gas generator via a second mechanical member, the first mechanical member having a first rotary part coupled to the electrical machine and a second rotary part coupled to the main gearbox, wherein the first mechanical member has a first position mechanically coupling the first and second rotary parts such that the electrical machine drives the main gearbox with the electrical machine operating as a motor and such that the main gearbox drives the electrical machine with the electrical machine operating as a generator to generate electrical energy;

wherein the first mechanical member has a second position mechanically decoupling first and second rotary parts when the first rotary part rotates at a speed of rotation (Vmr) faster than a speed of rotation (Vbtp) of the second rotary part; and wherein the second mechanical member selectively mechanically couples the electrical machine and the gas generator such that the electrical machine drives the gas generator with the electrical machine operating as a motor to start the engine.

* * * * *